United States Patent
Zheng (10) Patent No.: US 9,853,815 B2
(45) Date of Patent: Dec. 26, 2017

(54) PASSWORD VERIFYING DEVICE AND METHOD

(71) Applicants: Lee Zheng, Dongguan (CN); Smart Electronic Industrial (Dong Guan) Co., Ltd., Dongguan (CN)

(72) Inventor: Lee Zheng, Dongguan (CN)

(73) Assignees: Lee Zheng (CN); Smart Electronic Industrial (Dong Guan) Co., Ltd. (CN)

( * ) Notice: Subject to any disclaimer, the term of this patent is extended or adjusted under 35 U.S.C. 154(b) by 248 days.

(21) Appl. No.: 14/692,240

(22) Filed: Apr. 21, 2015

(65) Prior Publication Data

US 2015/0312040 A1    Oct. 29, 2015

(30) Foreign Application Priority Data

Apr. 24, 2014    (CN) .......................... 2014 1 0169452

(51) Int. Cl.
G06F 21/00    (2013.01)
H04L 9/32    (2006.01)
G06F 21/36    (2013.01)

(52) U.S. Cl.
CPC ............ *H04L 9/3231* (2013.01); *G06F 21/36* (2013.01); *G06F 2221/031* (2013.01)

(58) Field of Classification Search
CPC ... H04L 9/3231; G06F 21/36; G06F 2221/031
USPC ......................................................... 713/183
See application file for complete search history.

(56) References Cited

U.S. PATENT DOCUMENTS

| | | | | |
|---|---|---|---|---|
| 8,117,652 B1* | 2/2012 | Lu | ........................... | G06F 21/36 713/182 |
| 2003/0210127 A1* | 11/2003 | Anderson | ............... | G06F 21/36 340/5.27 |
| 2005/0071637 A1* | 3/2005 | Shirakawa | .............. | G06F 21/36 713/170 |
| 2007/0277224 A1* | 11/2007 | Osborn | ................... | G06F 21/36 726/2 |
| 2012/0194549 A1* | 8/2012 | Osterhout | .......... | G02B 27/0093 345/633 |

* cited by examiner

*Primary Examiner* — Teshome Hailu
(74) *Attorney, Agent, or Firm* — Lerner, David, Littenberg, Krumholz & Mentlik, LLP (57) ABSTRACT

A password verifying method includes the following steps: providing a plurality of interactive regions in which several known password characters are arranged and shown randomly, at least one interactive region containing at least two characters; accepting selection of one of said plurality of interactive regions by a user, and after selection of one of the interactive regions by the user, randomly re-distributing said several known password characters into said interactive regions for subsequent selection by the user; and comparing characters contained in a predefined password sequence with characters contained in the interactive regions selected by the user, and outputting a signal representing a successful password verification when each character contained in the password sequence is identical to corresponding ones of the characters shown in respective ones of the interactive regions selected by the user.

15 Claims, 2 Drawing Sheets

PASSWORD VERIFYING DEVICE AND METHOD

CROSS-REFERENCE TO RELATED APPLICATIONS

The present application claims priority from Chinese Patent Application No. CN 2014-10169452.2 filed Apr. 24, 2014, the disclosure of which is hereby incorporated herein by reference.

BACKGROUND OF THE INVENTION

The present invention relates to an electronic safety protection technology, and more particularly, relates to a password verifying device and method.

With continuous improvement of the quality of life and security of people in society, password verifying devices and corresponding verifying methods have become widely used in various aspects of life. In a typical situation, almost every person currently owns at least one mobile phone or tablet computer, and in these devices, verification methods may often be employed. In fact, specific devices for verification may often be used. For a mobile terminal, a display screen based on touch-feedback principles is generally provided. The most convenient methods for password verification may include slide-unlock, face-unlock, unlock by drawing a particular pattern in a nine-grid screen, and the like, all of which are well known. All of these methods suffer from some drawbacks. For example, a slide-unlock action may be completely seen by unauthorized observers; a face-unlock input method may be circumvented by using a static image; and unlock by drawing a particular pattern in a nine-grid screen is a variation of using a nine-grid numerical keypad, so the input process may also be easily seen by unauthorized users, and may be easily circumvented. Apparently, these prior art password verification methods used in mobile terminals are susceptible to being circumvented by observation by unauthorized users, and therefore, all of these methods fail to achieve a desirable level of security.

Earlier verification methods were mostly performed mechanically. For instance, the combination locks extensively used in many kinds of bags and suitcases are one kind of mechanical password verification device. This kind of mechanical input verification device similarly suffers from well-known disadvantages, and as a result, electronic verification devices are gradually replacing mechanical verification devices. As such, password verification devices may be implemented not only in various electronic mobile terminals, but also in other situations where password verification is necessary. For example, travel bags and suitcases may employ a password verification method in their electronic lock verification mechanisms. In another example, domestic electronics such as smart TVs, interactive routers, or central control devices may use the aforementioned electronic password verification methods in their verification procedures. In a further example, the above electronic verification methods may also have application in access control systems, electronic locks of a vending machine, safes, car doors, and garage doors. Such electronic password verification methods may even be used in new products that may emerge in the future that may require password verification. Understandingly, password verification methods are so important that they can have a great influence on various aspects of daily life. Accordingly, it is desirable to provide a good password verifying device and corresponding method to achieve improved security.

However, as described above, despite the importance of password verification devices, currently-available verification methods are not satisfactory. During the process of industrial design, designers should consider not only performance and security of the products discussed above, but also the production cost and convenience of the products. Therefore, driven by a balance among these industrial factors, verification techniques have been advanced gradually.

SUMMARY OF THE INVENTION

The object of the invention is to overcome the drawbacks of prior art technology and to provide password verifying methods and corresponding devices that have high security and are easy to use.

To above ends, the following technical solution is proposed.

A password verifying method of the invention for verifying whether a user-inputted password is correct includes the following steps:

(1) Providing a plurality of interactive regions on each of which several known characters are arranged and shown randomly, at least one interactive region containing at least two characters;

(2) Accepting a user selection of one of said plurality of interactive regions, and after selection of one of the presently-shown interactive regions by the user, randomly redistributing said several known characters into said respective interactive regions to be shown for the next user-input selection; and (3) Conducting a one-by-one comparison of characters contained in a predefined password sequence with a series of user-selected characters contained in successive selections of corresponding ones of the interactive regions, and outputting a signal representing successful password verification when each character contained in the password sequence is identical to a corresponding character shown in a corresponding user-selected interactive region.

To realize both fuzziness and convenience, the number of characters displayed each time in respective interactive regions can be identical among the regions, and the number can be two or more. In addition, at least one character can be commonly displayed in two or more interactive regions. Furthermore, it is required that any particular character must not be simultaneously displayed in all of the interactive regions, which would make it uncertain whether or not the particular character has been selected by a user.

According to one embodiment of the invention, each time a user selection is accepted in step (2), a one-by-one comparison between the characters contained in the predefined password sequence and the characters displayed in the user-selected interactive regions is conducted in a manner as depicted in step (3). When it is confirmed that a current character contained in said password sequence is identical to a character displayed in the currently-selected interactive region, the random redistribution method presented in step (2) is implemented to update the characters of the respective interactive regions. After the redistribution is completed, the device waits for the next user selection of an interactive region, and this process repeats until all of the characters contained in the password sequence are successfully confirmed. Then, a signal representing successful password verification is output in the manner of step (3).

According to another embodiment of the invention, in step (2), updated display content of the interactive regions is presented based on the number of the characters included in the password sequence. The characters displayed in the interactive region selected by the user are recorded each time the user input is accepted. Step (3) is performed only after all of the user selections of the corresponding interactive regions are performed. In this case, a comparison is made between each character of the predefined password sequence and the characters contained in the each of the corresponding user-selected interactive regions. When the comparison is successful, a signal representing successful password verification is output in step (3).

For security reasons, each time that the interactive regions are displayed, at least two of the interactive regions show different characters therein.

For efficiency of the password verifying method, during the process of one-by-one comparison of the characters in the predefined password sequence and the characters in the corresponding user-selected interactive regions, when it is determined that a specific character of the password sequence is not identical to that displayed in a corresponding user-selected interactive region, the present method immediately ends, canceling the performance of the subsequent steps in the verification method.

For security reasons, the predefined password sequence includes at least four characters.

To enhance the difficulty of achieving decryption, and for security reasons, the plurality of interactive regions that are shown at any given time can be displayed in different colors from one another.

In an embodiment of the invention, all of the interactive regions are each configured to receive a user touch operation to indicate an instruction that the respective interactive region has been selected by the user.

In another embodiment of the invention, each interactive region is associated with a corresponding input circuit, and switch-on of a respective input circuit is transformed into selection of a respective interactive region associated therewith.

In a further embodiment of the invention, each interactive region is associated with a different predefined label. When the accepted input is equivalent to a specific label, a corresponding interactive region associated with said label is selected. Preferably, each said predefined label is voice data or image data.

A password verifying device of the invention may be used to perform the aforementioned method of touch operation of the interactive regions. The device includes a control unit, a storage unit, and a touch screen. The storage unit stores a password sequence. The control unit is intended to execute a program to implement portions of said method. The touch screen is used to display interactive regions for the program implemented by the method, to receive selection operations of the user indicating the interactive regions, and to transform the selection operation into instructions of selecting the interactive regions.

Another kind of password verifying device of the invention is adapted to implement the method of associating the interactive regions with the input circuits. Said device includes a control unit, a storage unit, several input circuits, and a display screen. The storage unit stores a password sequence. The control unit is intended to perform a program realized by said method. The display screen is used to display interactive regions for the program implemented by the method. Each input circuit is electrically connected to the control unit and corresponds to a respective interactive region. Switching-on of each input circuit will transform this switching-on status into instructions of selecting a corresponding interactive region.

Another kind of password verifying device of the invention is adapted to implement a method of associating the interactive regions with corresponding predefined labels representing voice data. Said device includes a control unit, a voice input unit, a storage unit, and a display screen. The storage unit stores a preset password sequence and said predefined label. The control unit is intended to perform a program implemented by said method. The display screen is used to provide interactive regions for the program implemented by the method. The voice input unit is electrically coupled with the control unit. The voice input unit receives voice data input. When the control unit determines that the input voice data is identical to one of the predefined labels, an instruction of selecting an interactive region associated with said predefined label is output.

Another kind of password verifying device of the invention is adapted to implement a method of associating the interactive regions with corresponding predefined labels representing status data. Said device includes a control unit, an image recognition unit, a storage unit, and a display screen. The storage unit stores a preset password sequence and said predefined label. The control unit is intended to perform a program implemented by said method. The display screen is used to display interactive regions for the program implemented by the method. The image recognition unit is electrically coupled with the control unit. The image recognition unit captures a face image of the user, extracts eyes feature information from the image, and recognizes the open/close status of the eyes. When the control unit determines that the eyes feature information is identical to one of the predefined labels representing status data, an instruction of selecting an interactive region associated with said predefined label is output.

The present invention has the following advantages when compared with prior art technology.

First, in this invention, all of the characters contained in a predefined password are collectively considered as a sequence. A series of characters containing those of the password are randomly divided into several portions, and each portion is displayed in a corresponding interactive region for selection of the same region by the user. As such, the selection operation of a specific interactive region by the user is interpreted as selection of the characters displayed in this interactive region showing in a key layout displayed before this selection. Each time the user selects one of the interactive regions, the arrangement and combination of the characters of these regions may be changed. Therefore, fuzziness of the selected characters is greatly enhanced. Even if the selection activity by the user during the password verifying process is observed by an unauthorized observer, such an observer will still not be able to ascertain the accurate password sequence, thus greatly improving the security of the password verification process.

Second, after several characters are randomly sorted into multiple groups and are shown in respective interactive regions, each group may contain more than one character. In this situation, the user no longer relies upon buttons (area) to input the password, the number of the buttons being the same as that of the interactive regions. The number of conventional buttons is decreased to equal the number of the interactive regions of the invention. Accordingly, operation convenience is improved for the user. In addition, the security effect is not affected at all by the reduction in the number of conventional buttons.

Third, in a further improvement of the invention, by showing a particular character in at least two interactive regions of a button layout, it is permitted to have the same number of characters displayed in each region. On the one hand, this displaying of a particular character in multiple regions enhances the displaying effect of the characters, and on the other hand, it improves fuzziness of the password by showing the same character in two or more regions, thereby increasing security. Furthermore, for a legal user, since the same character is displayed in more regions at a given time, selection of any region covering this character will confirm that the same character is identical to a corresponding character of the password sequence. This further improves the convenience of the operation method.

Finally, selection of the interactive regions may be implemented by touch screen input, hardware circuit input, voice input, and the like. Input of the password may be accomplished by different kinds of input means including tools such as a touch screen, physical buttons, a microphone, or the like. A conclusion may be drawn that the present invention has extensive applications and will have a great influence on security technology of electronic devices.

DETAILED DESCRIPTION OF THE INVENTION

Various embodiments of the invention are described below in greater detail with reference to the drawings.

Figure 1:
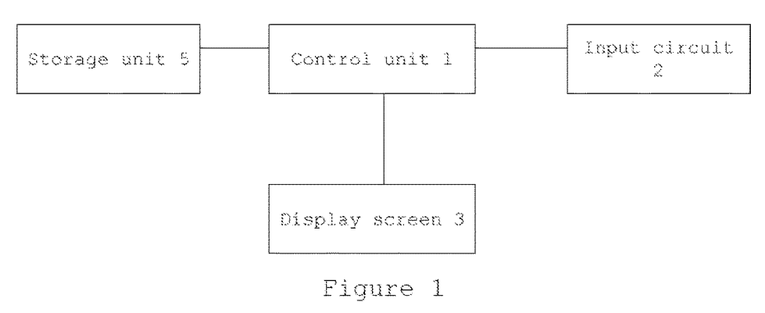
FIG. 1 shows a schematic view of an electrical structure of a password verifying device of the invention.

Referring to FIG. 1, a password verifying device of the invention includes a control unit 1, a storage unit 5, a display screen 3, and several input circuits 2.

The control unit 1 operates to control the entire device and mainly serves to perform a program according to a password verifying method of the invention, so as to perform a password verification process. The storage unit 5 functions to permanently or temporarily store various intermediate data generated during operation of the program and obtained according to a password verifying method of the invention. For example, the intermediate data may include a user's predefined password, partial or entire candidate information units, and selected information units. The storage unit 5 may also store predefined labels such as image, voice, and status, which may be involved during operation of a storage program. Those skilled in the art should note that the predefined password of the present method and device should be permanently stored (except if the user changes it when performing a reset process). Other data used in the method of the invention may be stored in the storage unit, depending on the needs of the program during its execution. Therefore, use of the storage unit in the invention should not be understood as limiting the storage technology used in this invention. Under the control of the control unit 1, the password verifying method of the invention accomplishes human-machine interaction by means of the input circuits 2 and display screen 3 to implement the password verification operation of the invention.

Figure 2:
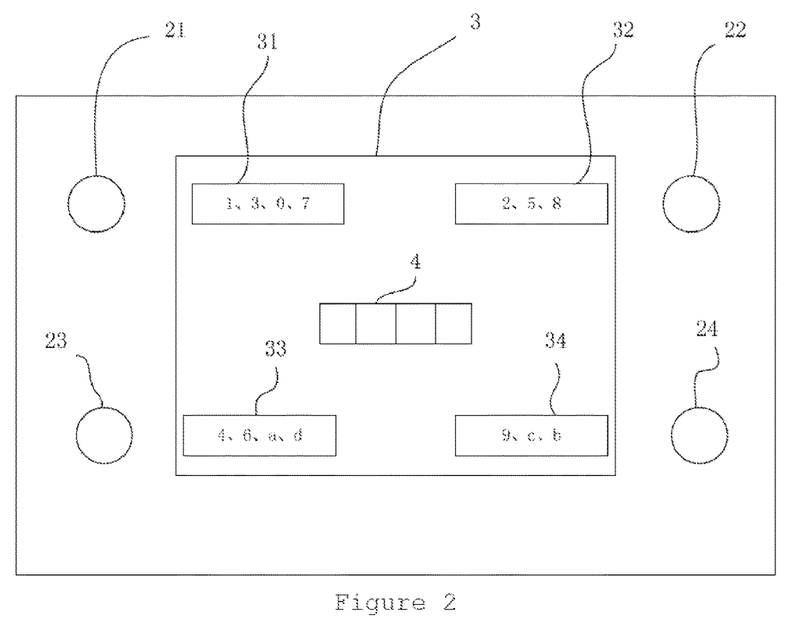
FIG. 2 shows an operation interface of a password verifying device of the invention.

In the exemplary interface of FIG. 2, a display screen 3 including four corners and a central area is shown. There are four interactive regions 31-34 located at the four corners of the display area, respectively, for displaying all of the elements of four candidate character sets for potential selection by the user. Each element in each of the four interactive regions 31-34 can be a character, and therefore, the interactive regions can be used for displaying a set of known characters. An output area 4 located at the center of the display screen is mainly intended for indicating verification progress of the user during the password input process. It is noted that according to the invention, there is no limit regarding location of the interactive regions as would be understood by those skilled in the art.

Four circular buttons 21-24 located close to the four interactive regions 31-34 of the display screen are configured to switch on the four input circuits 2, respectively, so that the control unit 1 is able to detect the switching on of a specific input circuit 2 and then transform it into an instruction of selecting a corresponding interactive region associated with the input circuit (button). In this manner, the user input is accepted. Accordingly, it is evident that selection of a specific interactive region 31-34 may be accomplished by pressing a corresponding button 21-24 adjacent to the same corresponding interactive region.

The above implementations are often seen on bags, suitcases, and POS terminals. They also can be adapted for use with ATMs, car security systems, and other applications where password verification is needed. According to a different implementation, the input circuit 2 may be simplified, and the display screen 3 may be implemented by a widely-used touch screen having a touch function. Moreover, for a "smart" system such as a mobile phone, a microphone may be used as a voice input unit, and the voice of the user is received by the voice input unit. The inputted user voice is recognized and compared with several predefined labels associated with respective interactive regions 31-34. When the voice data is consistent with the predefined labels, it is confirmed that a specific interactive region 31-34 associated with this label has been chosen. "Consistency" of voice data with a predefined label means that a piece of inputted voice data is compared with predefined voice data (or they are transformed into feature information and then are compared), and it is considered that they are consistent with one another within a tolerance range. This is also well known in the pertinent art. Similarly, a camera and related image analysis hardware and software may be used as an image recognition unit for performing an image recognition process, such as capturing an image of eyes of the user, extracting eye data from the image, recognizing an open/close status of the eyes, and if the eyes are open, comparing the eye data with the predefined labels associated with the respective interactive regions 31-34. If it is found that the eye data is consistent with a specific predefined label, the interactive region 31-34 associated with said label is selected. "Consistency" of the eye data with the label means that the image information or its image feature information (eye data) is equal or close to the predefined image data. By incorporating the various input tools described above, the device and method of the invention may be easily combined with various kinds of smart terminals.

No matter how the hardware is optimized and selected, implementation of the password verifying method of the invention will not be limited to a particular hardware configuration.

The password verifying method of the invention is based on the following general principles.

First, a storage unit 5 stores the predefined password of the user, and the password is composed of a sequence of characters. As such, the password may also be referred to as a password sequence. It is noted that the term "password sequence" does not mean there are several sets of sequential passwords, but only one password made of several characters in sequence. As noted above, input means of the predefined password may be flexibly configured by a person having ordinary skill in the art. It is well known that a password is generally constructed of characters. A simple password may include the digits 0-9. Of course, a password may also be constructed of other characters such as English letters or other punctuation or unusual signs. For convenience of the description of the invention, characters including the digits 0-9 and English letters a-d and the like are presented in FIG. 2. Each password sequence may be regarded as a known set of characters, such that each character is an element of the set. Of course, the password sequence should be arranged according to a certain order.

In the method of the invention, a "candidate character set," which is the set of characters that may appear on the display screen 3 in the interactive regions 31-34, is defined for the password sequence. The password sequence is composed of multiple "known characters" that are arranged according to a certain order. All of the characters of the password sequence, i.e., all of the elements of the known character set of the password characters, should be included in the candidate character set. In other words, the set of known password characters is a subset of the candidate character set. Alternatively speaking, the candidate character set is obtained by taking all elements of the set of known password characters and adding additional characters to that set. This is because when the user initially creates a predefined password, some of a group of characters are typically selected. As such, in general, a candidate character set to be shown on the display screen 3 includes a greater number of characters than the known set of password characters. However, the present invention does not exclude situations where the characters in the candidate character set (for display) are completely equal to the known characters in the password sequence. According to mathematics, complete equality is a specific example of inclusion.

Next, after the candidate character set for display and the known set of password characters are defined, all of the elements of the candidate character set are randomly distributed into several "candidate character subsets," each of which is a subset of characters of the candidate character set that will be displayed in a corresponding one of the interactive regions 31-34. At least one candidate character subset will include two or more elements. The elements of each candidate character subset are correspondingly distributed into and displayed in the several interactive regions, such that each interactive region corresponds to a respective one of the candidate character subsets and displays all elements of the respective candidate character subset. For example, in FIG. 2, four groups of characters displayed in the respective four interactive regions are randomly arranged. It is noted that the randomly arranged groups of characters may follow a pattern based on, for instance, ASCII code, natural numbers, and the like. The example of FIG. 2 should be understood as merely a specific example of the random distribution of the invention, and other character distributions should not be excluded from the present invention.

In the example of FIG. 2, there are 14 total characters in the four interactive regions, and these 14 characters belong to four candidate character subsets. As these 14 characters are distributed into four candidate character subsets, each candidate character subset generally necessarily contains multiple character elements. This ensures "multi-vocal" expression after each candidate character subset is displayed in a corresponding interactive region, which means that a user's selection of any particular candidate character subset cannot be definitively determined by an unauthorized observer to be directed to an intended selection of any specific one of the characters of the candidate character subset, thus significantly improving security of the predefined password sequence. In a case in which the several characters of the candidate character set are distributed into multiple candidate character subsets, and the number of the candidate character subsets is smaller than that of the characters of the candidate character set, at least one candidate character subset will contain two or more character elements. Or, some candidate character subsets may contain no characters, while the rest of the candidate character subsets may contain all of the characters of the candidate character set. This will also ensure that at least one candidate character subset will contain two or more character elements. In theory, as long as only one candidate character subset contains more than one character element, the password verification process will definitely be multi-vocal, and the objective of the invention will be met. However, the preferred situation is that each candidate character subset contains two or more character elements to enhance the "fuzziness" of the password verification process, which means that if an unauthorized observer watches a user select the interactive regions, the actual characters in the user's predefined password sequence are not definitively revealed to the observer.

Figure 3:
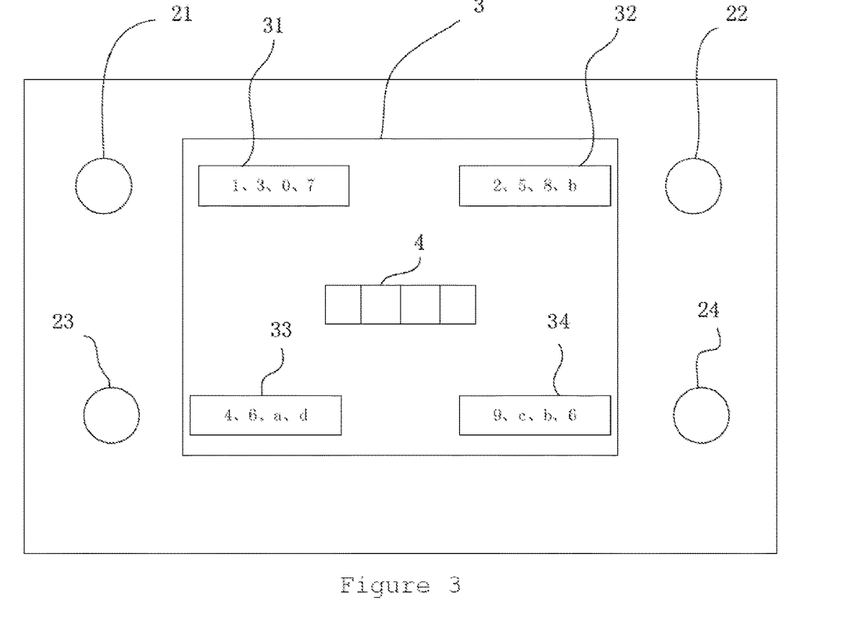
FIG. 3 shows another operation interface of a password verifying device of the invention.

As an improvement, referring to FIG. 3, after random distribution of all of characters in the candidate character set, all of the candidate character subsets may be configured so that they contain same number of characters. Here, at least two different interactive regions 31-34 may contain at least one of the same characters, which are referred to as "common characters" for simplicity. These common characters are displayed in two or more different interactive regions to further improve the fuzziness of the password verification process. Implementation of these common characters in the interactive regions may have some flexibility. For example, in the embodiment of FIG. 2 described above, 14 characters are arranged into four candidate character subsets, such that some of the four interactive regions 31-34 will contain a different number of characters than others of the four interactive regions. According to the further improvement of FIG. 3, one or two additional characters may be randomly added to those candidate character subsets of FIG. 2 having less than four characters, so that each candidate character subset has four characters. Thus, each interactive region 31-34 will also show four characters in the example of FIG. 3. In this case, two or more interactive regions will contain at least one common character. In this situation, the four regions will have the same number of characters as one another. As the time taken for a user to input selections of the interactive regions is very short, it will be hard for an unauthorized observer to successfully obtain the predefined password due to the existence of the common characters; and therefore, security of the password is also improved. Of course, this improvement will not improve security if a particular common character appears in all of the interactive regions (candidate character subsets). Accordingly, in practice, it is preferable that the same character should not be shown in every interactive region. However, this is not meant to exclude this situation from the spirit of the invention.

A solution has been described in which all elements of the password sequence are randomly distributed among the candidate character subsets, and during the process of password verification, the contents of each candidate character subset are updated in real time after each user selection of an interactive region 31-34. That is, the character layout shown in the respective interactive regions 31-34 is updated in real time, thus providing higher security. However, the invention also discloses the following solution. Before verification of a password element of a first interactive region 31-34, the elements of the candidate character set are randomly distributed among the four interactive regions so as to form four respective candidate character subsets. During subsequent password element selections, the candidate character subsets are no longer updated. This solution is also feasible. Although this solution reduces the complexity of computation required for implementation, it still maintains multivocality and concealment of the actual predefined password from unauthorized observers. It will not be necessary for the user to reread the contents of each candidate character subset for each user selection of an interactive region 31-34, and therefore, this embodiment can improve the convenience of the password verification method.

In addition, in the above solution in which the candidate character set is divided into multiple candidate character subsets so as to form an interactive region layout, distribution of the elements among the candidate character subsets is random and arbitrary. However, non-random distribution of the elements is also possible in the present invention. For instance, several layout solutions in which the candidate character subsets are randomly arranged may be stored in the storage unit 5 in advance of performing the password verification process. These different layout solutions may be arranged in accordance with a certain order. Before verification of each element of a password, a different interactive region layout solution may be used according to its rank in the prearranged order. As a result, interactive region layout solutions may be dynamically updated during the password verification process, and it is assured that all characters in the candidate character subset of a certain layout solution are randomly arranged. The operation of the prearranged order of the program is transparent to the user, as the user only sees the characters contained in the candidate character subset of a corresponding interactive region.

Next, after the candidate character set has been divided into several candidate character subsets, an instruction by the user for selecting a specific interactive region is received based on the respective elements of the known password character set. It is then determined whether the candidate character subset displayed in a specific interactive region selected currently by the user contains a corresponding known character of the password sequence. When all of the interactive regions sequentially selected by the user each are verified as containing a corresponding known character of the password sequence, a signal indicating successful password verification is output, and it is confirmed that the password verification is successful.

As discussed above, according to one embodiment of the invention, input of a selection instruction of the user may be accomplished by manually clicking the physical buttons 21-24. According to an embodiment not shown, when a touch display screen is used, clicking of a corresponding interactive region has the same effect. The clicking action is transferred to the control unit 1 via the touch display screen 3, and the clicking action is transformed into an instruction of selecting a corresponding interactive region 31-34. Alternatively, a voice input unit such as a microphone may be used to receive a voice instruction from the user. Keywords equivalent to the predefined label of an interactive region representing voice data may be identified to achieve selection of the corresponding interactive region. The identification may be implemented by the control unit 1 such that the control unit directly generates a selection instruction associated with the corresponding interactive region. Furthermore, an image recognition unit such as camera may be used to capture a feature of the user's eyes so as to decide whether the action of the user's eyes is equivalent to the selection of a certain interactive region. By the same token, the control unit 1 may analyze the image data obtained by the camera, and it may compare the data with the predefined label representing a certain status action of the user's eyes (also referred to as "eyes feature information") so as to achieve an image recognition function, thereby directly generating a selection instruction associated with the interactive region.

No matter what means is used to indicate a selection of a particular interactive region, various kinds of known input means may be used to select a particular candidate character subset (characters displayed in the corresponding interactive region). Therefore, the user's input means that the authorized user recognizes one of the character elements shown in the selected interactive region and has input the correct selection. This operation is applied for each element of the predefined password sequence. According to the predefined order of the known password sequence, and for each password character, the user makes a selection of one of the interactive regions, thus a selection of one interactive region corresponding to each password character in the sequence is obtained. For this method, password verification is achieved by checking one-by-one whether each successive element of the known character set belongs to the candidate character subset corresponding to a particular interactive region selected by the user. When a current element of the known character set (character included in the password sequence) belongs to the candidate character subset corresponding to a specific interactive region (character displayed in the region) selected currently by the user, it is confirmed that the user has input the correct password character. Otherwise, an incorrect password character has been input by the user.

Once several selection operations (the number is generally the same as the total number of the elements in the predefined password sequence) correctly match all the password characters, this means that the password has been successfully verified. In this instance, the password verifying device of the invention outputs a signal indicating successful verification of the password to an external unit for further operation, such as unlocking, performing a transaction, starting a program, and the like, thereby ending the verification process. Of course, in a case in which the user inputs a specific character or inputs a specific element of the known character set, but the candidate character subset (content displayed by the interactive region) fails to contain this specific element (e.g., a password character), this means that verification of the password fails. For security reasons, in the present method, subsequent steps may be terminated via the program, and a warning may be provided, thus ensuring security.

In the method of the invention, although a candidate character set is divided into multiple candidate character subsets, the number of the subsets is the same as that of the interactive regions, and the number of the interactive regions is smaller than that of the elements of the candidate character subsets, computation times are nonetheless increased to overcome drawbacks resulting from having an insufficiency of the total number of interactive regions that are displayed, as each time the candidate character subset corresponding to the interactive regions are updated, random re-arrangement is performed, thus ensuring security.

The method of the invention is realized by a computer program. The design of the program may be flexible. To easily understand the present invention so as to easily practice the same, program implementation of the verifying method of the invention is described below with reference to the drawings.

A first kind of verification implementation:

First, according to the arrangement order of the respective elements of the known character set (i.e., arrangement order of the password characters included in the predefined password sequence), the following sub-steps are performed:

1. All of the elements of the candidate character set are processed and divided into multiple sets, each of which is a candidate character subset. The number of the subsets is the same as that of the interactive regions of the password verifying device. Preferably, each candidate character subset contains at least two elements. Or, as shown in FIG. 3, the number of elements contained in each candidate character subset is identical. When the number of the elements of the candidate character set is not able to be evenly distributed into the candidate character subsets, it may be allowed that at least two different candidate character subsets may contain at least one common character, such that all of the candidate character subsets have the same number of the elements. Next, each candidate character subset is assigned to a corresponding one of the interactive regions, and all elements of the respective candidate character subsets are correspondingly arranged into respective interactive regions such that each interactive region displays several characters. If desired, each interactive region may display the same number of the characters. In the design of the program, to ensure that each interactive region displays the same number of the characters, at least two different interactive regions may contain at least one common character.

2. Wait for user input. After reading the characters shown in the candidate character subsets of respective interactive regions of the display screen, the user determines and selects a target interactive region. Adapted to the above various means implemented by hardware, the user's selection operation is conducted either manually, via voice, or by a visual check. After the program accepts the user instruction of selecting a specific interactive region containing a current element (current password character) of the known character set, the program immediately checks whether the current element (current password character) of the known character set is included in the displayed candidate character subset of the specific interactive region selected by the user. This checking operation may be accomplished by comparing the current element with the elements of the candidate character subset, as would be understood by a person having ordinary skill in the art. When the check result is affirmative, that is, when the current element of the password is included in the candidate character subset, a label variable (e.g., a temporary label) may be set to indicate a password verification success, for example, the label variable may be assigned the value "Y". Otherwise, the label variable is set to indicate a password verification failure, and for example, may be assigned the value "N".

The above two steps are performed for each password character. In theory, verification of each password character requires the above two steps to be performed.

After completion of the above cycle, meaning that for each of the password characters, the user has chosen respective interactive regions, the user password input is completed. Therefore, subsequent feedback actions may be performed. Specifically, in the present method, the result of the password verification process may depend upon the status of the label variable. If at the time of the feedback action, the variable is still assigned to "Y," then password verification is successful, and a signal indicating successful password verification is output for further operation. Otherwise, if the label variable is assigned to "N," even as the result of a single incorrect interactive region selection, the above cycle is terminated. In this situation, it is confirmed that the password verification has failed, a signal indicating the failed password verification is output, and the result is provided to the user.

A second kind of verification implementation:

First, according to the arrangement order of the respective elements of the known character set (i.e., the arrangement order of the password characters included in the password sequence), the following sub-steps are performed.

1. All of the elements of the candidate character set are processed and divided into multiple sets, each of which is a candidate character subset to be displayed in a corresponding interactive region. The number of the subsets is the same as that of the interactive regions of the password verifying device. Preferably, each candidate character subset contains at least two elements. Next, each candidate character subset is assigned to a corresponding interactive region, and all elements of respective candidate character subsets are correspondingly arranged into respective interactive regions such that each interactive region displays several characters. The number of elements contained in each candidate character subset may be identical. When the number of the elements of the candidate character set cannot be evenly distributed into the subsets, it may be allowed that at least two different candidate character subset may contain at least one common character, such that all of the candidate character subsets have the same number of elements. Next, all elements of the respective candidate character subsets are correspondingly arranged into respective interactive regions such that each interactive region displays several characters. If desired, each interactive region may display the same number of characters. In the design of the program, to ensure that each interactive region displays the same number of characters, at least two different interactive regions may contain at least one common character.

2. Wait for user input. After reading the characters shown in the candidate character subsets of respective interactive regions of the display screen, the user determines and selects a target interactive region. Adapted to the above various means implemented by hardware, the user's selection operation is conducted either manually, via voice, or by a visual check. Different from the previous verification process, after the program accepts the user instruction of selecting a specific interactive region containing a current element (current password character) of the known character set, a check is not performed immediately. Rather, correlation data between the current element (current password character) and the candidate character subset of a respective interactive region selected by the user is established and stored in the storage unit. After that, the program returns back to step 1 to verify the next password character, until the last character is verified. Then, the next steps are performed.

The previous cycle is ended to accept the user's input and selection of the respective password characters, such that all of the elements of the known character set have been selected by the user, thus establishing a corresponding relationship among the respective elements and dynamic candidate character subsets. Subsequently, a new cycle may begin. Specifically, the corresponding relationship data is invoked, and it is checked whether a current element included in each group of corresponding relationship data belongs to a candidate character subset associated with said data. If the answer is yes, then the current checking result is given a temporary label, and a corresponding label variable indicates a password verification success. Otherwise, if the current password element fails to belong to a corresponding candidate character subset selected by the user, then the label variable indicates a password verification failure. The current cycle is ended once there is at least one verification failure indicated by the label variable. In this case, it may be confirmed that password verification has failed based on an indication of the label variable, and a signal representing password verification failure is output, thus improving the efficiency of the program. If all of the elements of the password are checked and no password verification failure result is indicated, then password verification is successful based on the label variables, and a signal representing password verification success is output.

It should be emphasized that various software programs may be used to implement the aforementioned processes due to use of different program languages, different programming styles, and the like. The above embodiments are only for illustrative purposes and are not intended to limit the scope of the invention.

In summary, the password verifying device of the invention is based on the password verifying method of the invention. By providing fuzziness to the contents input by the user, the input contents become multi-vocal, thus ensuring that the password will not become known to an unauthorized observer during the user password input process. In addition, by randomly and dynamically generating the contents displayed for input by the user, password operation complexity is increased. This method significantly improves security and convenience of the password verification process.

Although various embodiments of the invention have been illustrated above, a person of ordinary skill in the art will understand that, variations and improvements made upon the illustrative embodiments fall within the scope of the invention, and the scope of the invention is only limited by the accompanying claims and their equivalents.

The invention claimed is:

1. A password verifying device, comprising:
   memory configured to store instructions for executing a method comprising:
   (a) displaying a plurality of candidate sets of characters in respective separate interactive regions of a display screen of the password verifying device, the characters in each candidate set being randomly generated by a control unit of the device, at least one of the candidate sets containing at least two characters, the separate interactive regions of the display screen being associated with corresponding ones of a plurality of predefined labels, each of the predefined labels comprising predefined image data;
   (b) receiving a user input of an individual one of the candidate sets, including: (i) receiving feature image data comprising a face of a user and determining if eyes of the user are open or closed; and (ii) if the eyes of the user are open, associating the feature image data with a corresponding one of the predefined labels associated with the individual one of the candidate sets;
   (c) comparing each character of the individual one of the candidate sets selected by the user to a corresponding one of the characters in the password; and
   (d) re-distributing the characters in the candidate sets among the candidate sets if the individual one of the candidate sets selected by the user contains a character identical to the corresponding one of the characters in the password;
   (e) repeating the receiving, comparing, and re-distributing for each of the characters in the password in the specified order, until either: (i) the user input has been received and the candidate sets selected by the user each contain a character identical to the corresponding one of the characters for each of the characters in the password; or (ii) if any of the candidate sets selected by the user does not contain a character that is identical to the respective one of the corresponding ones of the characters in the password; and
   (f) outputting a signal representing successful password verification if each of the individual ones of the candidate sets selected by the user contains a character that is identical to a respective one of the corresponding ones of the characters in the password,
   wherein each of the separate interactive regions of the display screen is configured to be activated by a user, wherein during the receiving of the user inputs, the individual ones of the candidate sets are selected by activating the respective separate interactive regions of the display screen.

2. The device according to claim 1, wherein a same number of the characters is displayed in each of the candidate sets, and at least one of the characters of the candidate sets is commonly displayed in at least two of the candidate sets.

3. The device according to claim 1, wherein during the comparing of the characters of the individual ones of the candidate sets selected by the user, if any of the characters of the individual ones of the candidate sets selected by the user is not identical to the respective one of the corresponding ones of the characters in the password, the receiving of the user inputs is ended such that no additional ones of the user inputs are received.

4. The device according to claim 1, wherein the number of characters of the password is at least four characters.

5. The device according to claim 1, wherein two or more of the candidate sets of the characters are displayed in the respective separate interactive regions of the display screen in different colors from one another.

6. The device according to claim 1, wherein each of the candidate sets of the characters is associated with a corresponding one of the predefined labels that is different than the predefined labels of the other candidate sets, such that a user input of a selection of one of the predefined labels is received as a selection of the candidate set associated with the selected one of the predefined labels.

7. The device according to claim 1, further comprising:
   the control unit for executing the instructions; and
   the display screen for displaying the plurality of candidate sets of characters in the respective separate interactive regions, each of the separate interactive regions of the display configured to be activated by a user, such that during the receiving of the user inputs, the individual ones of the candidate sets are selected by activating the respective separate interactive regions of the display screen, and the control unit is configured to interpret the activating of the respective separate interactive regions as the user inputs.

8. The device according to claim 1, further comprising:
   the control unit for executing the instructions;
   the display screen for displaying the plurality of candidate sets of characters in the respective separate interactive regions; and
   a plurality of input circuits, each input circuit communicatively coupled to the control unit and corresponding to a respective one of the separate interactive regions, such that the control unit is configured to interpret activating of the input circuits as the user inputs.

9. A method of verifying a password including a number of characters in a specified order, the method comprising:
   (a) displaying a plurality of candidate sets of characters in respective separate interactive regions of a display screen of a password verifying device, the characters in each candidate set being randomly generated by a control unit of the device, at least one of the candidate sets containing at least two characters, the separate interactive regions of the display screen being associated with corresponding ones of a plurality of predefined labels, each of the predefined labels comprising predefined image data;
   (b) receiving a user input of a selection of an individual one of the candidate sets, including: (i) receiving feature image data comprising a face of a user and determining if eyes of the user are open or closed; and (ii) if the eyes of the user are open, associating the feature image data with a corresponding one of the predefined labels associated with the individual one of the candidate sets;
   (c) comparing each character of the individual one of the candidate sets selected by the user to a corresponding one of the characters in the password;
   (d) re-distributing the characters in the candidate sets among the candidate sets if the individual one of the candidate sets selected by the user contains a character identical to the corresponding one of the characters in the password;
   (e) repeating the receiving, comparing, and re-distributing for each of the characters in the password in the specified order, until either: (i) the user input has been received and the candidate sets selected by the user each contain a character identical to the corresponding one of the characters for each of the characters in the password; or (ii) if any of the candidate sets selected by the user does not contain a character that is identical to the respective one of the corresponding ones of the characters in the password; and
   (f) outputting a signal representing successful password verification if each of the individual ones of the candidate sets selected by the user contains a character that is identical to the respective one of the corresponding ones of the characters in the password,
   wherein each of the separate interactive regions of the display screen is configured to be activated by a user, wherein during the receiving of the user input, the individual one of the candidate sets is selected by activating the respective separate interactive region of the display screen.

10. The method according to claim 9, wherein a same number of the characters is displayed in each of the candidate sets, and at least one of the characters of the candidate sets is commonly displayed in at least two of the candidate sets.

11. The method according to claim 9, wherein during the comparing of each character of the candidate set selected by the user, if any of the candidate sets selected by the user does not contain a character that is identical to the respective one of the corresponding ones of the characters in the password, the repeating of the receiving, comparing, and re-distributing is ended such that no additional ones of the user inputs are received.

12. The method according to claim 9, wherein the number of characters of the password is at least four characters.

13. The method according to claim 9, wherein two or more of the candidate sets of the characters are displayed in the respective separate interactive regions of the display screen in different colors from one another.

14. The method according to claim 9, wherein each of the candidate sets of the characters is associated with a corresponding one of the predefined labels that is different than the predefined labels of the other candidate sets, such that a user input of a selection of one of the predefined labels is received as a selection of the candidate set associated with the selected one of the predefined labels.

15. One or more non-transitory computer readable media storing computer-executable instructions for verifying a password including a number of characters in a specified order that, when executed by one or more processors, causes the one or more processors to perform operations comprising:
   (a) displaying a plurality of candidate sets of characters in respective separate interactive regions of a display screen of a password verifying device, the characters in each candidate set being randomly generated by a control unit of the device, at least one of the candidate sets containing at least two characters, the separate interactive regions of the display screen being associated with corresponding ones of a plurality of predefined labels, each of the predefined labels comprising predefined image data;
   (b) receiving a user input of a selection of an individual one of the candidate sets, including: (i) receiving feature image data comprising a face of a user and determining if eyes of the user are open or closed; and (ii) if the eyes of the user are open, associating the feature image data with a corresponding one of the predefined labels associated with the individual one of the candidate sets;
   (c) comparing each character of the individual one of the candidate sets selected by the user to a corresponding one of the characters in the password;
   (d) re-distributing the characters in the candidate sets among the candidate sets if the individual one of the candidate sets selected by the user contains a character identical to the corresponding one of the characters in the password;
   (e) repeating the receiving, comparing, and re-distributing for each of the characters in the password in the specified order, until either: (i) the user input has been received and the candidate sets selected by the user each contain a character identical to the corresponding one of the characters for each of the characters in the password; or (ii) if any of the candidate sets selected by the user does not contain a character that is identical to the respective one of the corresponding ones of the characters in the password; and
   (f) outputting a signal representing successful password verification if each of the individual ones of the candidate sets selected by the user contains a character that is identical to the respective one of the corresponding ones of the characters in the password,
   wherein each of the separate interactive regions of the display screen is configured to be activated by a user, wherein during the receiving of the user input, the individual one of the candidate sets is selected by activating the respective separate interactive region of the display screen.

* * * * *